Fig. 1.

INVENTORS
DANIEL H. ROBBINS
RICHARD K. WALKER
BY
ATTORNEYS

Feb. 26, 1963 D. H. ROBBINS ETAL 3,078,771
FILM MAGAZINE FOR PHOTOTYPOGRAPHICAL MACHINES
Filed May 13, 1959 8 Sheets-Sheet 4

Fig. 4.

INVENTORS
DANIEL H. ROBBINS
BY RICHARD K. WALKER
ATTORNEYS

United States Patent Office 3,078,771
Patented Feb. 26, 1963

3,078,771
FILM MAGAZINE FOR PHOTOTYPOGRAPHICAL MACHINES
Daniel H. Robbins, Bronxville, N.Y., and Richard K. Walker, Convent, N.J., assignors to Mergenthaler Linotype Company, a corporation of New York
Filed May 13, 1959, Ser. No. 813,020
31 Claims. (Cl. 95—4.5)

This invention relates to tape operated phototypographical machines such as the one disclosed in the copending application Serial No. 419,012, filed March 26, 1954, and assigned to the assignee of the present invention. More particularly, the invention relates to a film magazine for such machines.

In these machines, as a coded tape is fed into a reading head, transverse type lines are photographed one after another in spaced relation on a strip of film as the latter is advanced endwise through the magazine in step-by-step fashion. In addition, the film is generally perforated at the ends of each composed line, on the longitudinal axis thereof, which perforations serve to facilitate making corrections on the processed film.

A film magazine is disclosed in United States Patent No. 2,845,012, dated July 29, 1958, and also assigned to the assignee of the present invention, wherein after a line of typographical characters has been composed, a pair of punches are employed to perforate the film at each end of the line, and then, while still in their film perforating position, to advance the film to bring an unexposed portion thereof into position for photographing the next succeeding line. According to the same patent, each time that the amount of film advance is to be changed due to, for example, a change in the point size of type being composed or a change in the amount of leading desired between the type lines, mechanism must be set manually to effect such change. In applying the teachings of this patent, it has been found that the film perforating punches employed to advance the film frequently tear or mutilate it, with the result that the film is not advanced the desired amount and consequently the spacing between the composed type lines will be improper or in the extreme case, the characters comprising two separate type lines may overlap. In addition, since the change of film advance requires a manual operation, the feeding of the control tape through the reading head must be arrested when such changes are made, thereby resulting in an undue amount of machine down time.

These problems arising out of the disclosure of United States Patent No. 2,845,012 are dealt with in copending application Serial No. 614,736, filed October 8, 1956, now Patent No. 2,959,111, which is also assigned to the assignee of the present invention, wherein an improved film magazine is disclosed. In the latter disclosure, means are introduced to solve the problem of the former invention. To that end, friction rollers are provided to advance the film, and the film perforating punches are utilized only to arrest the film after it has been advanced by the rollers. Furthermore, tape controlled mechanism is provided to eliminate any manual operation when the amount of film advance is varied. In operation, the friction rollers of the second mentioned film magazine were found to slip occasionally, resulting in the film not being advanced the desired amount, and in addition the tape controlled mechanism, while satisfactory, did not permit a great enough flexibility of composition.

It is the object of the present invention to provide a more improved film magazine having means for accurately advancing the film the desired amount, as well as means responsive to the control tape for permitting highly flexible and automatic composition. Toward this end, the present invention provides a sprocket wheel for advancing the film which in turn is furnished with a series of feed holes along one edge thereof for engagement by the sprocket wheel. In addition, one automatic mechanism is provided for varying the extent of film advance, and a separate automatic mechanism is provided for positioning the film in order to effect lower slug line alignment of the characters comprising a type line, thereby adding great flexibility of composition.

The invention will be more fully described in the following description in which reference is made to the accompanying drawings.

Referring to the drawings.

Figure 1:
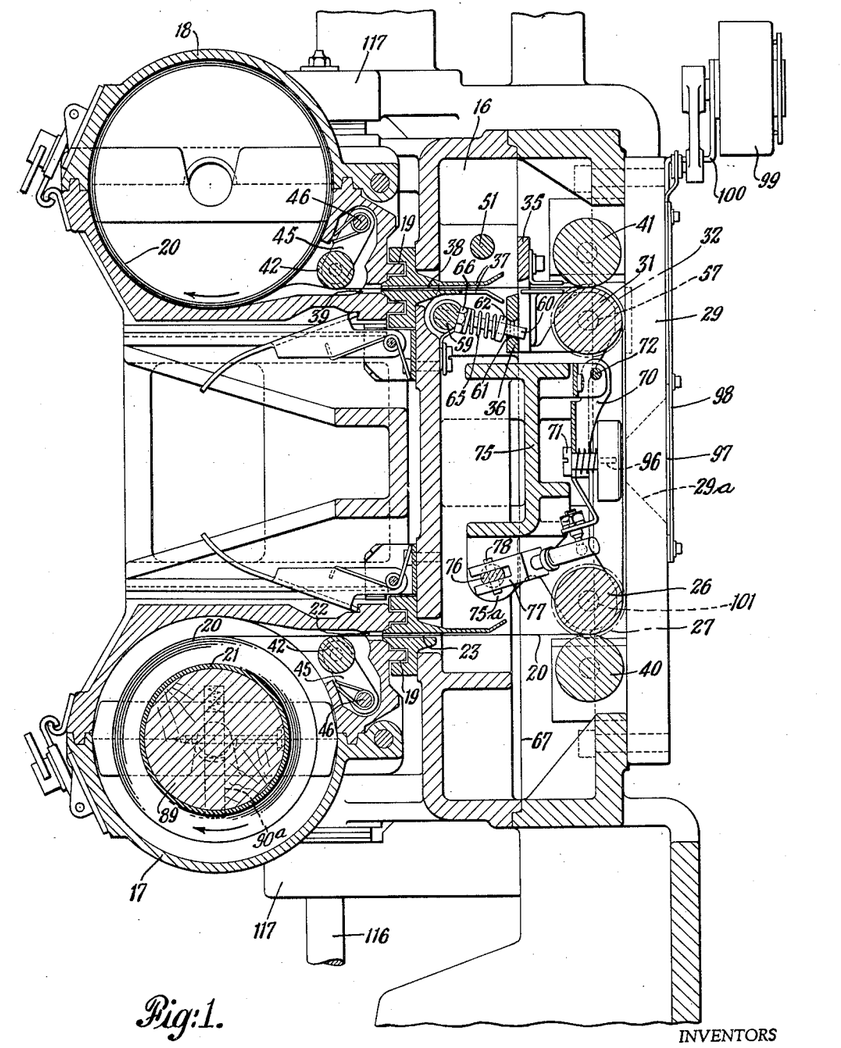
FIG. 1 is a vertical cross-sectional view taken along line 1—1 of FIG. 2.
Figure 2:
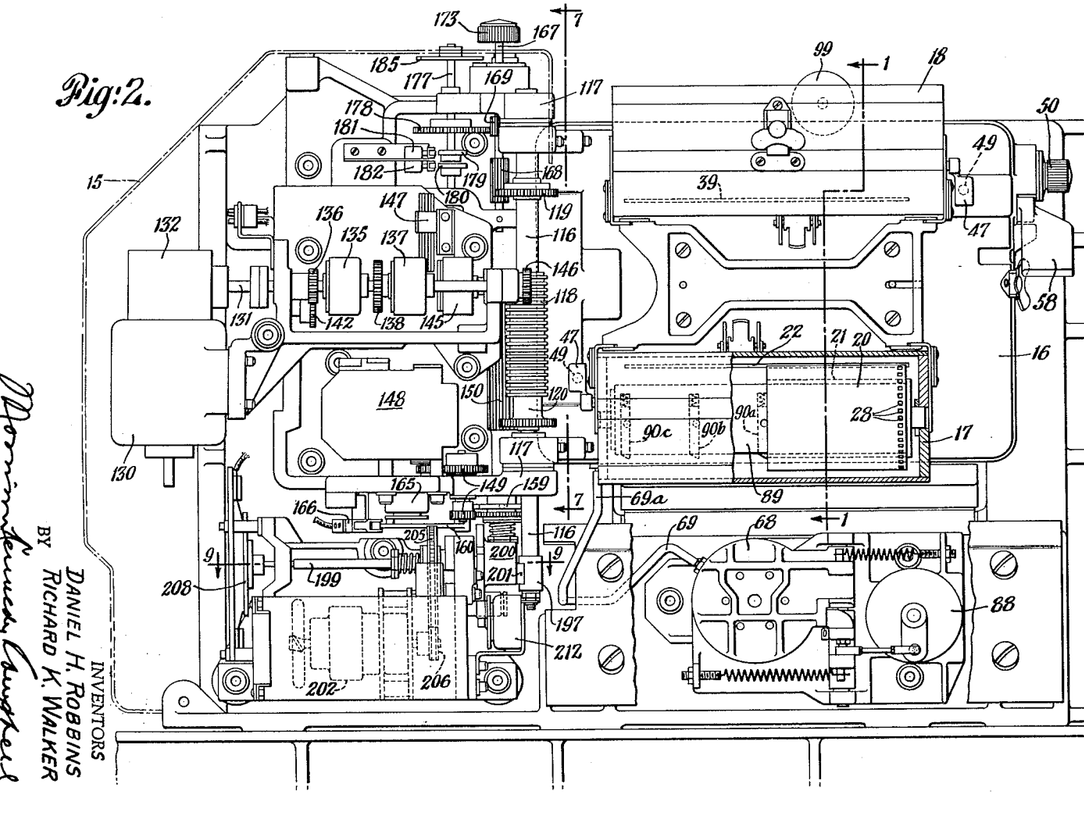
FIG. 2 is a rear elevational view of the film magazine, showing the mechanism contained therein.

The present film magazine may be thought of as comprising, generally, a film handling portion, shown in FIG. 1 and the right-hand half of FIG. 2, and a control mechanism portion enclosed in a housing 15, illustrated in the left-hand half of FIG. 2. As will be more fully described hereinafter, the two portions of the film magazine are interconnected by a driving mechanism which transmits power from the motors of the control portion to the film driving sprocket wheel of the film handling portion.

Figure 13:
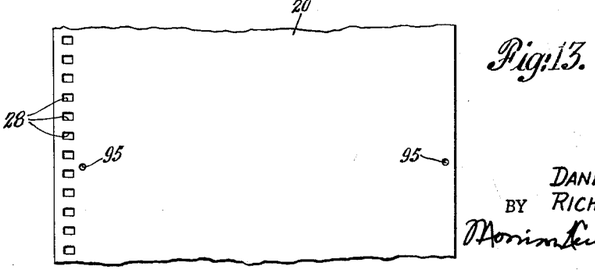
FIG. 13 shows a portion of a film strip.

Referring now to FIG. 1, the film handling portion of the present film magazine comprises a light-tight compartment 16 having a film supply cassette 17 and a film take-up cassette 18 removably mounted thereon by means of light-tight telescopic fittings 19. A strip of film 20 leads from the reel 21 in the supply cassette through the mutually opposed slots 22 and 23 in the cassette and compartment 16 (see FIG. 2), and is drawn about the lower film roller 26, at which point the sprocket wheel 27, mounted adjacent one end of the roller 26 (see FIG. 4), engages the feed holes 28 (see FIG. 13) of the film strip 20. The film continues upwardly between an apertured plate 29 secured to the front wall of the compartment 16 and an oppositely disposed platen 30, then around the film drive roller 31, the sprocket wheel 32 mounted adjacent one end of the roller 31 (see FIG. 4) engaging the feed holes 28 of the film strip, across a pair of vertically disposed knives 35 and 36, the upper knife 35 being stationary, and the lower knife 36 being slidable vertically, through a pair of horizontal guide plates 37, and finally through the mutually opposed slots 38 and 39 in the compartment 16 and take-up cassette 18 (see FIG. 2), the film forming a reel as it winds upon itself by following the inside surface of the take-up cassette. The rollers 40 and 41 serve to support the film as it travels over the lower film roller 26 and the film drive roller 31, respectively.

Figure 3:
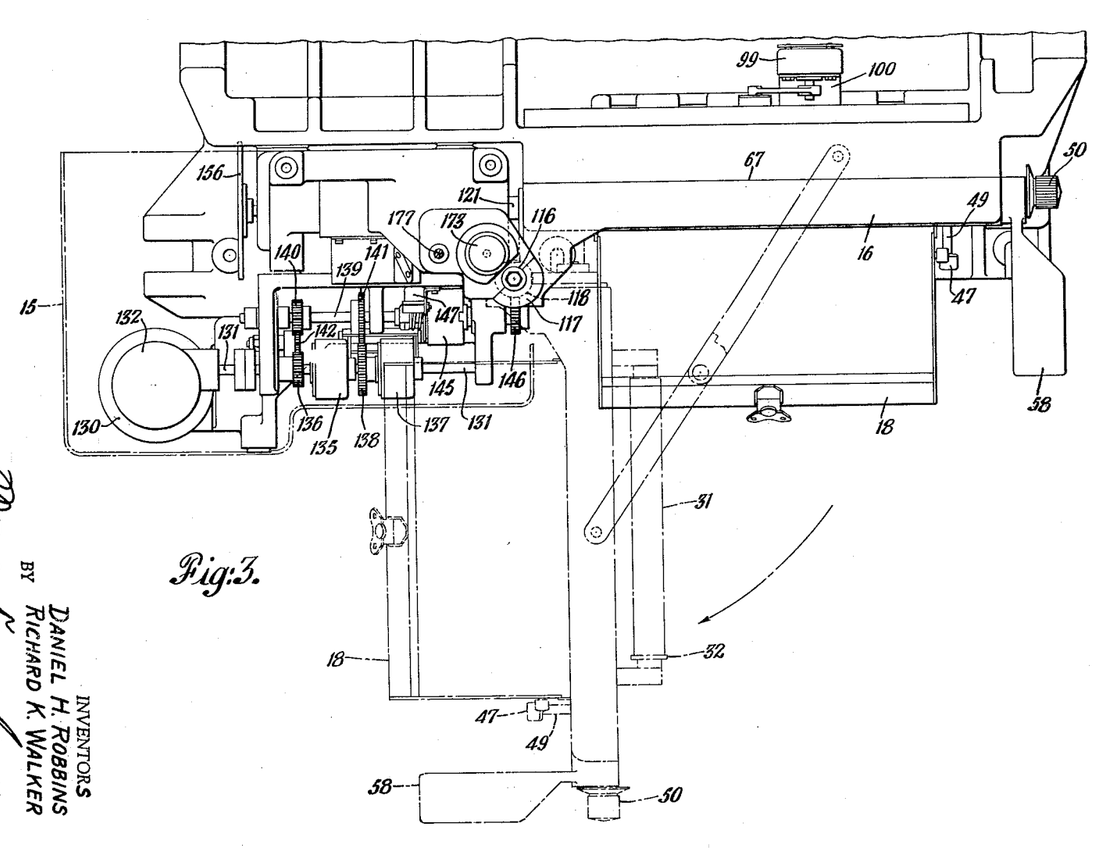
FIG. 3 is a plan view of the film magazine, showing the manner in which the film handling portion thereof may be swung open in order that the film may be conveniently threaded therein.

Note that each of the cassettes is provided with a roller 42 mounted between two levers 45 fast on a pivotal shaft 46. The roller is normally spring biased against a portion of the internal cassette wall accurately shaped to seat it properly, in which position the roller serves to shut out any light which might enter the cassette through the slot 22 or 39 when the cassette is removed from the compartment 16. Furthermore, a strip of film may be threaded through the slot without breaking the light-tight seal offered by the roller 42. This arrangement permits the leading edge of the film to be drawn out of the supply cassette preliminary to loading the magazine, i.e. threading the film as described above, without exposing the film remaining in the cassette even though the loading be done in daylight. When the cassette is then mounted on the compartment 16, a finger lever 47, mounted externally on the pivotal shaft 46, contacts a stationary pin 49 (see FIGS. 2 and 3), thereby pivoting the shaft 46 and the levers 45 resulting in the roller 42 being held in the position shown in FIG. 1, thus allowing the film 20 to be freely withdrawn from the cassette 17. A finger lever 47 is also provided to take-up cassette 18 and serves to hold the roller 42 away from the slot 39 to allow free entrance of the film into the cassette. Of course, once the cassettes have been mounted on the compartment 16, it is permissible to uncover the slots 22 and 39 since the danger of fogging the film due to exposure is practically nil.

Naturally, the leading portion of the film which is used for threading the film through the magazine will become fogged during magazine loading; therefore, after the magazine is shut but before composing begins, the film is manually advanced by means of the external knob 50 (see FIG. 4) in order to position an unexposed portion of the film opposite the aperture 29a in the apertured plate 29. The knob 50 is mounted outwardly of the magazine on the end of a shaft 51. Inside the magazine, the shaft 51 carries a gear 52 (see FIG. 7) engaging a gear 55 which itself engages a gear 56 mounted on the film drive roller shaft 57. After composition has been completed, the film is again manually advanced by means of the knob 50 until all of the type bearing film has reached the cassette 18, at which time the hand lever 58 is employed (FIGS. 2, 3 and 4) to slide the lower knife 36 past the upper knife 35 thereby severing the film. The hand lever 58 is mounted on a pivotal shaft 59 (see FIGS. 1 and 4) having a pair of levers 60 also mounted thereon, each of which levers passes through an aperture 61 in the lower knife. When the hand lever is depressed, the shaft 59 is pivoted, rotating the lever 60 and sliding the lower knife upwardly. A collar 62, slidably mounted on the lever 60, forces the compression spring 65 against the nut 66 as the lower knife moves upwardly. When the hand lever 58 is released, a spring (not shown) returns the lower knife to its normal position. Thereafter, as the take-up cassette is removed, the finger lever 47 will move out of contact with the stationary pin 49, thus permitting the spring biased roller 42 to close the slot 39 and prevent fogging of the type carrying film.

The present magazine is so constructed as to provide a greatly simplified loading technique. As may be seen clearly in FIG. 3, a section of the film handling portion of the present magazine is pivotally mounted so that it may be swung open 90° from its normal closed position. Viewing FIG. 1, the pivotally mounted section of the film handling portion of the magazine swings away from the compartment 16 along the break line 67, taking its constituent members, i.e. the lower film roller 26, the platen 30, the film drive roller 31, the film severing knives 35 and 36, and the two cassettes with it (see FIG. 4 which shows these members in their open position) while leaving the support rollers 40 and 41 and the apertured plate 29, as they were. Now then, to load the magazine after the film has been brought through the slots 22 and 23, the film need merely be drawn around the lower film roller 26, in front of the platen 30, around the film drive roller 31, and between the severing knives without having to thread the film through numerous narrow passages. The leading edge of the film is then inserted into the take-up cassette, the pivotally mounted section is swung shut (into the position shown in FIG. 1), and the film is advanced manually by means of the knob 50, as mentioned above, to bring unexposed film into the compartment in final preparation for composition. It should here be noted that when the magazine is opened as just described, no provision need be made for disconnecting the driving mechanism which links the control mechanism portion of the magazine to the film handling portion since the driving mechanism remains in engagement throughout the magazine loading operation. This feature of the present invention will be more fully described hereinafter.

Figure 4:
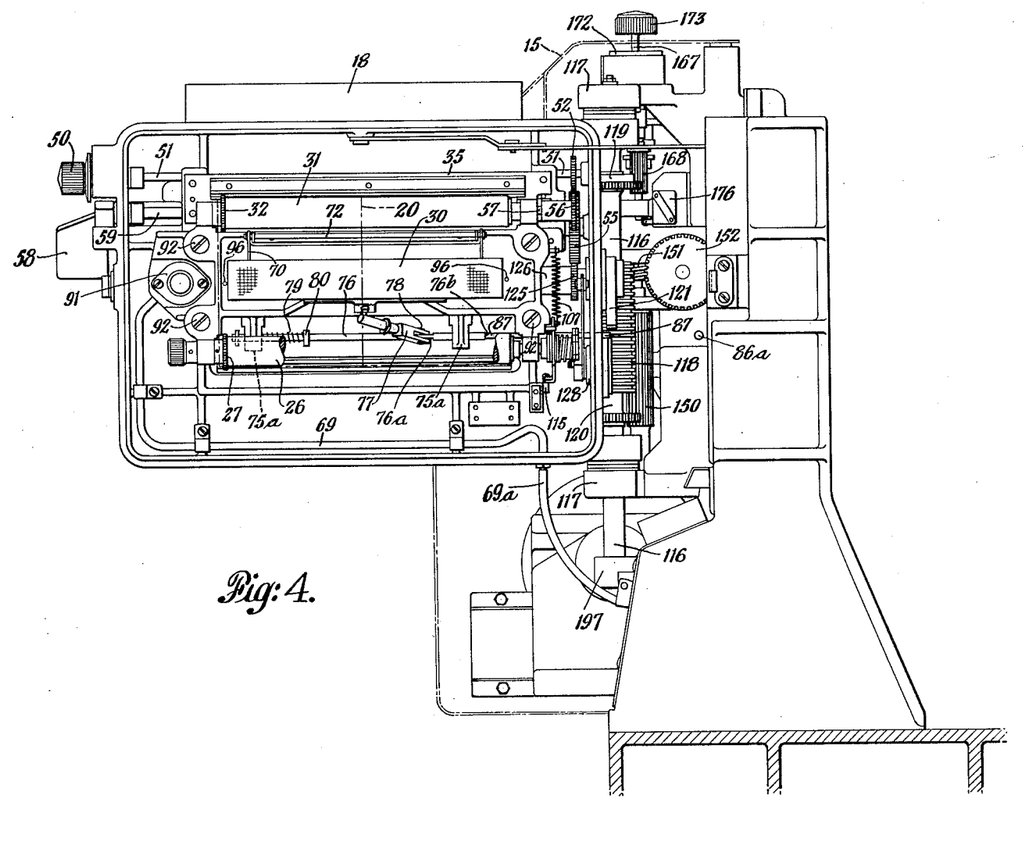
FIG. 4 is a side elevational view of the film magazine, with a section of the film handling portion thereof in open position.

During composition, the platen 30 (FIGS. 1 and 4) presses the film against the rear face of the apertured plate 29 in order to hold the film in the focal plane of the optical system of the phototypographical machine, thus, assuring that the character images falling on the film are in proper focus. The platen is provided with a vacuum to insure that the film is held flat in wrinkle-free condition, by a vacuum bellows 68 (FIG. 2) which is connected to the platen by a tube 69, a section 69a of which is made flexible to permit the film handling portion of the magazine to be open and shut freely. When, on the other hand, the film is to be advanced, preparatory to composition of a new line, the platen 30 must be moved away from the aperture plate and the vacuum must be broken to free the film for movement. Toward this end, the platen 30 is mounted on a U-shaped supporting frame 70 by the fastening means 71. The U-shaped supporting frame 70 is pivotally secured to a stationary shaft 72 fixed to the frame 75 which is itself secured to the light-tight compartment 16. The platen and its supporting frame are swung back and forth by a toggle-type arrangement comprising an axially translatable shaft 76, having a flattened section 76a, and a yoke member 77 which fits over the flattened section 76a and is pivotally fastened thereto by the pin 78. At its other end, the yoke member 77 is connected by means of a ball joint to a depending portion of the platen supporting frame 70. The shaft 76 passes slidably through two depending supporting members 75a of the frame 75, and a compression spring 79, surrounding the shaft 76 and disposed between one of the supporting members 75a and a collar 80 fixed on the shaft 76 normally holds the shaft 76 to the right, in FIG. 4, and the platen away from the apertured plate 29. When, however, the shaft 76 is moved to the left against the action of the spring 79, the toggle action of the yoke member 77 causes the platen to be moved forward against the apertured plate 29. Operation of the shaft 76 is controlled by a rotary solenoid 81 (see FIG. 5) which is shown in deenergized condition. The pin 81a of the solenoid is disposed between two collars 82 and 85 fixed on an axially slidable shaft 86. When the solenoid 81 is energized, the pin 81a swings to the right and strikes the collar 85 moving the shaft axially, the end 86a of which abuts an intermediate shaft 87 which in turn abuts the end 76b of the shaft 76, causing the platen to move forwardly against the apertured plate 29. When the solenoid is deenergized, the pin 81a snaps back against the collar 82 pulling the shaft 86 to its normal position. FIG. 4 being a view of the magazine in open position, the end 86a only of the shaft 86 is shown; however, when the magazine is closed, the three shafts 76, 86 and 87 become aligned.

The operation of the vacuum bellows 68, which is clearly described in the above-mentioned Patent No. 2,959,111, is controlled by a solenoid 88 which when energized works the bellows to produce a vacuum, the latter being transmitted via the tube 69 to the platen 30. Therefore, before the film is advanced, the solenoid 88 is deenergized in order to relieve the vacuum at the platen so that the film may be moved freely.

The present invention is adapted to handle strips of film having widths of 4, 6, or 8 inches. As may be seen clearly in FIG. 2, the core 89 within the supply cassette is provided with three spring loaded detents 90a, 90b and 90c, the outer end of each being beveled so that as a new reel of film is slipped over the core 89 from left to right, the detents will smoothly slide beneath the surface of the core 89. Once the reel has passed over a detent, it will pop up above the surface as before and act as a stop against which the side of the film opposite the feed holes will abut. The reel of film 21 is thereby held firmly in proper position on the core. The reel of film shown in FIG. 2 has a 4 inch width and abuts against the detent 90a; a 6 inch and an 8 inch film would abut against detent 90b and detent 90c, respectively.

Referring now to FIG. 4, a valve 91 is positioned in the vacuum line 69 and may be set to limit the vacuum to 4 inches or 6 inches of the platen or to transmit the vacuum to the entire length thereof depending upon the width of the film being handled. In this way, only the portion of the platen covered by the film will have vacuum applied to it thus preventing a weakening of the vacuum by offering the system no opening to the atmosphere.

Employment of the platen so far disclosed presents a problem, should it be desired to perforate a 4 inch or a 6 inch film at the ends of each line, after it is composed, since it might be necessary in such cases to position the punches which are to do the perforating, so that the right hand one thereof comes through the platen. This is obviously an undesirable manner of construction. It is therefore contemplated that by removing the four screws 92, the unit comprising the frame 75, the valve 91, the roller 26, the roller 31, and the platen 30 together with its supporting member 70 and the shaft 76, may be withdrawn and replaced with one of three similar units differing from the replaced unit in the following ways: they would have no valve 91, the lengths of the platen and rollers 26 and 31 of each would be either 4, 6 or 8 inches, the one used depending on the width of film being used, and they would each have a pair of punches disposed one at each end of the platen. If then, for example, an 8 inch film were being used and if it were to have perforations 95 (see FIG. 13) at each end of each type line, the unit corresponding to an 8 inch film would be mounted in the magazine by means of the four screws 92, and the punches 96 at each end of the platen would properly perforate the film in the usual manner. The manner in which punches may be embodied may be seen in the aforementioned Patent No. 2,959,111.

The light-tight compartment is provided with a shield 97 slidably retained in a frame 98 mounted on the front face of the apertured plate 29. When the solenoid 99, which is mounted on a bracket 100 fixed to the apertured plate 29, is energized, the shield 97 is raised to uncover the aperture 29a and allow the light from the typographical characters to reach the film. However, if for some reason the phototypographical machine cabinet (not the magazine) is opened during composition, extraneous light might get into the magazine through the aperture 29a and fog the film. For this reason, a switch is provided which opens when the cabinet is opened, thereby effecting deenergization of the solenoid 99 and allowing the shield 97 to fall in front of the aperture and protect the film.

Figure 11:
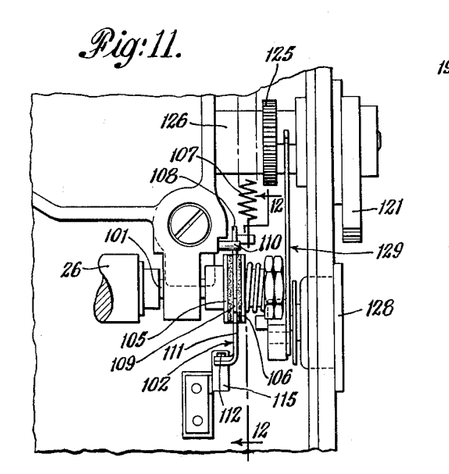
FIG. 11 is an enlarged detail view of a portion of FIG. 4, showing the clutch mechanism of the lower film roller.
Figure 12:
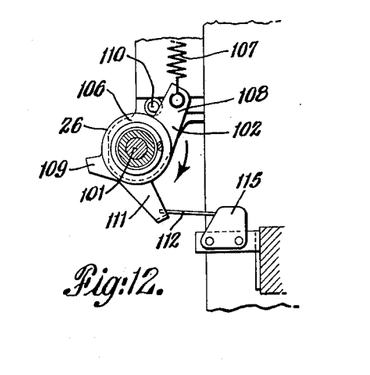
FIG. 12 is a view taken on line 12—12 of FIG. 11.

Referring now to FIGS. 4, 11 and 12, the shaft 101 upon which the lower film roller 26 is mounted is provided with means for maintaining the film under tension at all times as it moves through the magazine, thereby assuring perfect registry of the film, and for producing an end-of-film alarm to notify the operator that the supply cassette is empty. A tri-fingered member 102 is loosely mounted on the shaft 101 between the plates of a clutch, one plate 105 being fixed to the shaft, and the other plate 106 being slidable thereon. A compression spring urges the slidable plate 106 toward the fixed plate, thereby bringing both clutch members into frictioned engagement with the member 102. After the magazine has been loaded as described above, and the knob 50 is being employed to advance the film, the roller 26 and its shaft 101, of course, rotate due to the engagement of the sprocket wheel 27 with the feed holes 28 of the moving film. In addition, the clutch members 105 and 106 and the member 102 rotate in the direction of the arrow in FIG. 12, against the force of the tension spring 107 disposed between the finger 108 of the member 102 and the magazine frame, and continue until the finger 109 strikes the abutment 110, at which time the clutch will slip as the film continues to move. The spring 107 tends to pull the film back in the direction opposite to that of its advance, thus keeping the film under tension. When the trailing edge of the film leaves the roller 26, the spring 107 is free to rotate the member 102 and the clutch back to their original position wherein the finger 111 of the member 102 strikes a contact 112 of a switch 115 which closes a circuit producing the end-of-film signal for the operator.

Referring again to FIG. 2, the left-hand half thereof depicts the control mechanism portion of the present film magazine. The means for driving the film drive roller 31 of the film handling portion of the magazine include a shaft 116 loosely mounted in the magazine frame 117, and a tubular rack member 118 surrounding the shaft 116 and slidable therealong. An upper rack stop 119 is fixed on the shaft 116 above the rack 118, and a lower film advance control nut 120 is threaded on the shaft 116 below the rack. Both the stop 119 and the nut 120 are provided with gear teeth about their peripheries. The rack 118 is connected to the film drive roller shaft 57 by the gearing shown in FIGS. 4 and 7, which gearing comprises a sector gear 121 engaging the rack 118 and mounted on the shaft 122, a pinion 125 mounted on the same shaft 122 and engaging the gear 55, the gear 55 in turn engaging the gear 56 mounted on the film drive roller shaft 57. The shaft 122 is provided with a clutch disposed within the housing 126 (see FIG. 11) which normally does not transmit power from the sector gear 121 to the pinion 125 when the rack is driven upwardly toward the stop 119, but which does so transmit when the rack is driven downwardly. Therefore, when composition of a line has been completed, and the film is to be advanced to bring fresh film for a new line in front of the aperture 29a, the rack 118 is driven upwardly against the stop 119, by means to be described hereinafter, having the effect only of pivoting the sector gear 121, and thereafter, the rack is driven downwardly to rotate the film drive roller shaft 57 which effects the film advance.

The above-mentioned clutch within the housing 126 on the shaft 122 operates as above described when the rotary solenoid 128 is deenergized. When the solenoid 128 is energized, it shifts the linkages 129 which pivotally connect the solenoid 128 to the housing 126 thereby rearranging the clutch members so that the clutch will transmit power when the rack moves either upwardly or downwardly. The solenoid is normally deenergized and is energized only on the occasions to be mentioned hereinafter.

As was mentioned before, there is no need to disconnect the driving mechanism, which operates the film drive roller, when the film handling portion of the magazine is opened for loading since the entire driving mechanism remains in engagement at all times. This advantage is due to employment of the tubular rack 118, just mentioned, each of whose teeth runs around its entire surface. Therefore, since, as may be seen in FIG. 3, the pivotally mounted section of the film handling portion of the magazine pivots about the shaft 116 upon which the rack 118 is mounted, the sector gear 121 remains in engagement with the rack as the film handling portion of the magazine is opened.

Referring again to FIGS. 2 and 3, the rack 118 is operated by a rack drive motor 130 which rotates a shaft 131 through gearing in the box 132. Mounted on the shaft 131 is a rack-up electric clutch 135 and an associated gear 136, and a rack-down electric clutch 137 and an associated gear 138. When the motor 130 is running and the rack-up clutch is energized, the gear 136 will be rotated; however, when the rack-down clutch is energized, the gear 138 will be rotated. The two clutches cannot be energized at the same time. A second shaft 139, running parallel to the shaft 131, is provided with two gears 140 and 141, (see FIG. 3), one of which is joined to the gear 136 through an idler gear 42, and the other of which engages the gear 138 directly. The shaft 139 is also provided with a torque sensitive coupling 145 and, at its end, the shaft 139 carries a driving pinion 146 which engages the tubular rack member 118.

When the film in the magazine is to be advanced, a signal in the coded tape causes the solenoids 81 and 88 to be deenergized, thereby freeing the film for movement, and causes the rack drive motor 130 and the rack-up electric clutch 135 to be energized, thereby rotating the shaft 131, and through the gearing 136, 142 and 140, rotating the shaft 139 in the same direction, causing the pinion 146 to drive the rack 118 upwardly. When the rack abuts the upper stop 119, the torque in the shaft 139 builds up, whereupon the torque sensitive coupling 145 pops off its seat and operates a limit switch 147. The limit switch serves to deenergize the rack-up clutch 135 and energize the rack-down clutch 137, whereby the direction of rotation of the shaft 139 is reversed through the gearing 138 and 141. The pinion now drives the rack 118 downwardly, advancing the film, until the rack abuts the control nut 120, at which time the torque sensitive coupling 145 once again pops off its seat and operates the limit switch 147 which this time deenergizes the rack-down clutch 137 and the rack drive motor 130. The parts will remain deenergized until another film advance signal is read on the tape.

It is obvious that the amout of film that is advanced each time a type line is completed and the rack drive motor 130 is energized depends upon the spacing between the upper rack stop 119 and the film advance control nut 120, since these two abutments regulate the degree of movement of the rack 118. The extent of the film advance, in turn, depends upon two factors: the point size of the type being composed, and the amount of leading desired between successive type lines. Before composition begins, therefore, or any time point size or leading is changed, information concerning these factors will be fed into the machine via the control tape so that the spacing between the stop 119 and the nut 120 may be reset to accord with the changed amount of film advance which is called for.

As was mentioned before, the film advance control nut is threaded onto the shaft 116, therefore, rotation of the nut in one direction or the other will cause it to move closer to or farther from the upper stop 119 which remains stationary with respect to the shaft 116. Rotation of the nut 120 is effected by means of the film advance control motor 148 (see FIGS. 2 and 5) which acts through the gearing 149 to rotate a splined shaft 150 engaging the gear teeth around the periphery of the control nut. A splined shaft is employed, rather than an ordinary gear, because such a shaft will remain in engagement with the control nut 120 in all positions which the nut may take. The splined shaft 150 is provided at its upper end with a worm 151 which engages a worm wheel 152 mounted on the end of a shaft 155 having a commutator 156 fixed to its other end. A spring 157, surrounding the shaft 155 and having one end fixed to the magazine frame and the other end fixed to a collar 158 fast on the shaft, provides pressure between the worm 151 and wormwheel 152, making the shaft 155 and hence the commutator 156 very sensitive to rotation of the splined shaft 150. The direction and amount of rotation of the motor 148 and hence the control nut 120 is controlled by the commutator 156 through which the motor 148 is energized.

Due to the importance of the accuracy of the spacing between the stop 119 and the nut 120, the motor 148 must be arrested at the exact moment that the nut 120 reaches the proper position, and although the commutator 156 will deenergize the motor at the proper moment, it is desirable to provide means to prevent the inertia of the parts from carrying the nut past its proper position. Toward this end (see FIGS. 5 and 8) the splined shaft 150 is provided with a latch plate 159 having a single notch 159a in its periphery, and a latch 160 for engaging the notch 159a is pivotally mounted at 161 to the magazine frame. The finger 160a of the latch 160 is normally held in engagement with the notch 159a by the tension spring 162, thus locking the motor 148 against rotation. When the amount of film advance is to be changed, a latch solenoid 165 is energized to pivot the latch 160 against the force of the spring 162 into the position shown in FIG. 8, wherein the motor 148 is free to rotate. When the latch solenoid 165 is energized and the latch is pivoted, the end 160b of the latch acts to close a switch 166, the effect of which will be described hereinafter. The motor 148 is then energized to drive the control nut 120, and at a certain position of the parts when the shaft 150 carrying the latch plate 159 has less than one revolution left to turn before the control nut reaches its final position, the commutator 156 causes the latch solenoid 165 to be deenergized, which results in the finger 160a being brought into contact with the periphery of the latch plate 159, by the spring 162, whereon it rides until the notch 159a reaches a position of alignment with the finger, whereupon the finger 160a drops into the notch and arrests the motor. At this time, of course, the commutator cuts off the power to the motor 148, and the spacing between the stop 119 and the nut 120 will accord with the new type size and leading of the type lines to be composed.

Figure 7:
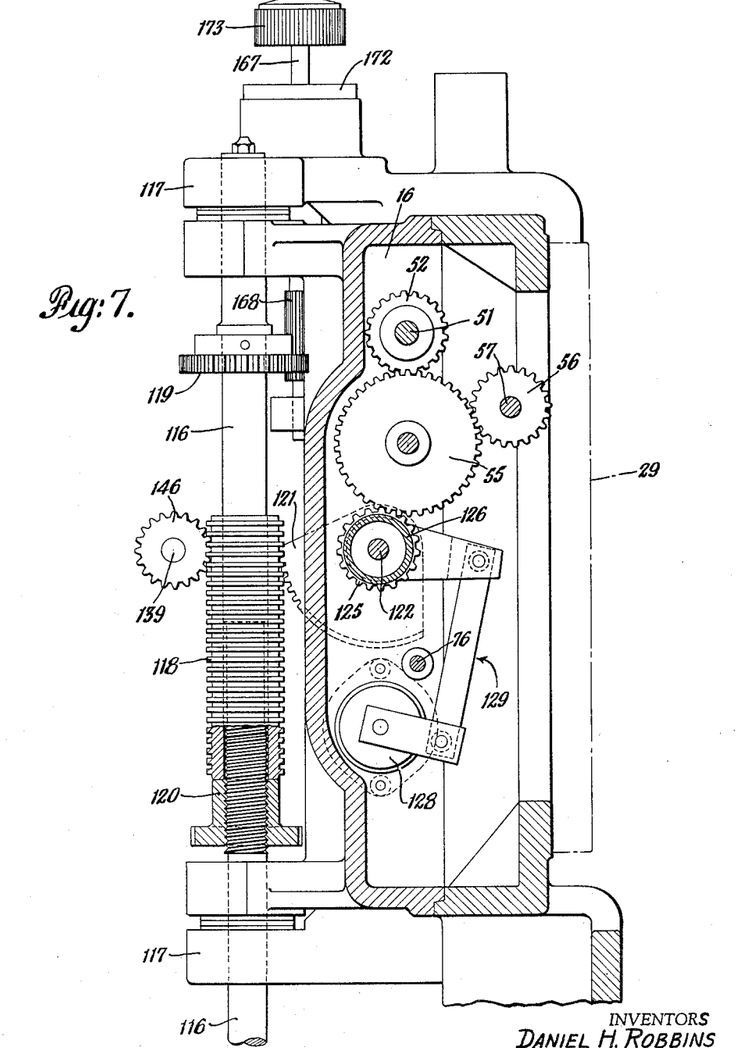
FIG. 7 is a view taken on line 7—7 of FIG. 2 showing a portion of the mechanism for advancing the film.

The change in the spacing between stop 119 and nut 120 which has just been described takes place subsequent to the advance of the film after composition of the last type line. This means that the amount of film which was advanced accords with the old type size and leading, and not with the new, and if, under these circumstances, composition were to begin using the new type, the spacing between the last type line of the old type, and the first type line of the new type, would be improper. To avoid this result, it is desirable to have the film shift while the change in spacing between the stop and nut is taking place in order to correct the last amount of film advanced so that it agrees with the new amount of film advance. This result is accomplished in the following manner: when a change of film advance is called for on the tape, the solenoids 81 and 88 are deenergized to free the film for movement, and the latch solenoid 165 is activated to pivot the latch 160 unlocking the control motor 148 and, as mentioned before, closing the switch 166. When the switch 166 closes, it energizes the crack-down electric clutch 137 and the rack drive motor 130, resulting in the pinion 146 urging the rack against the control nut 120. The torque sensitive coupling which ordinarily would deenergize the motor 130 and clutch 137 by operating the limit switch 147 is not permitted to function, hence the rack is continually urged against the control nut. In addition, the switch 166 serves to energize the solenoid 128 (FIG. 7)

which operates the linkages 129 and thereby resets the normally one-way clutch within the housing 126 so that it will transmit power no matter which direction the rack moves. Thereafter the control motor 148 is energized effecting the rotation of the control nut 120. Notice now, that whether the nut 120 is rotated so that it moves toward or away from the stop 119, the pinion 146 will keep the rack in contact with the nut. Therefore, the rack will move with the control nut and drive the film drive roller as described above, thereby correcting the position of the film so it accords with the new film advance.

If the control nut is moved downwardly, as for example would probably happen if the new type size were larger than the old type size, the additional film will be advanced, and the parts will react as usual. If, however, the control nut is moved upwardly, the film will be moved backwardly, in which case the film would ordinarily have a tendency to buckle if it were not for the tri-fingered member 102 (see FIG. 12). As mentioned hereinbefore, when the film is advanced, the member 102 is rotated in the direction of the arrow, against the force of the tension spring 107 until the finger 109 strikes the abutment 110. Therefore, the spring 107 has a tendency to rotate to lower film roller 26 backwardly through the frictional engagement of the member 102 and the clutch plates 105 and 106. When the film is moved backwardly, then it will be kept under tension and not permitted to buckle.

The present magazine is so designed that one revolution of the splined shaft 150 will cause a change in the film advance of one point, i.e. the spacing between the stop 119 and the nut 120 is so changed by each revolution of the splined shaft that the amount of film advance is changed by one point. Since the splined shaft may only be locked by the latch 160 and latch plate 159 (FIG. 8) once in each revolution thereof, the automatic film advance control means described above may vary the amount of film advance only in increments of one point. For film advance changes of less than one point, manual leading means are provided by which changes in increments of one-quarter point may be made. Furthermore, either positive or negative leading may be added to the film advance control, i.e. the spacing between the stop 119 and the nut 120 may be increased or decreased by employing the manual leading means.

Figures 5, 6:
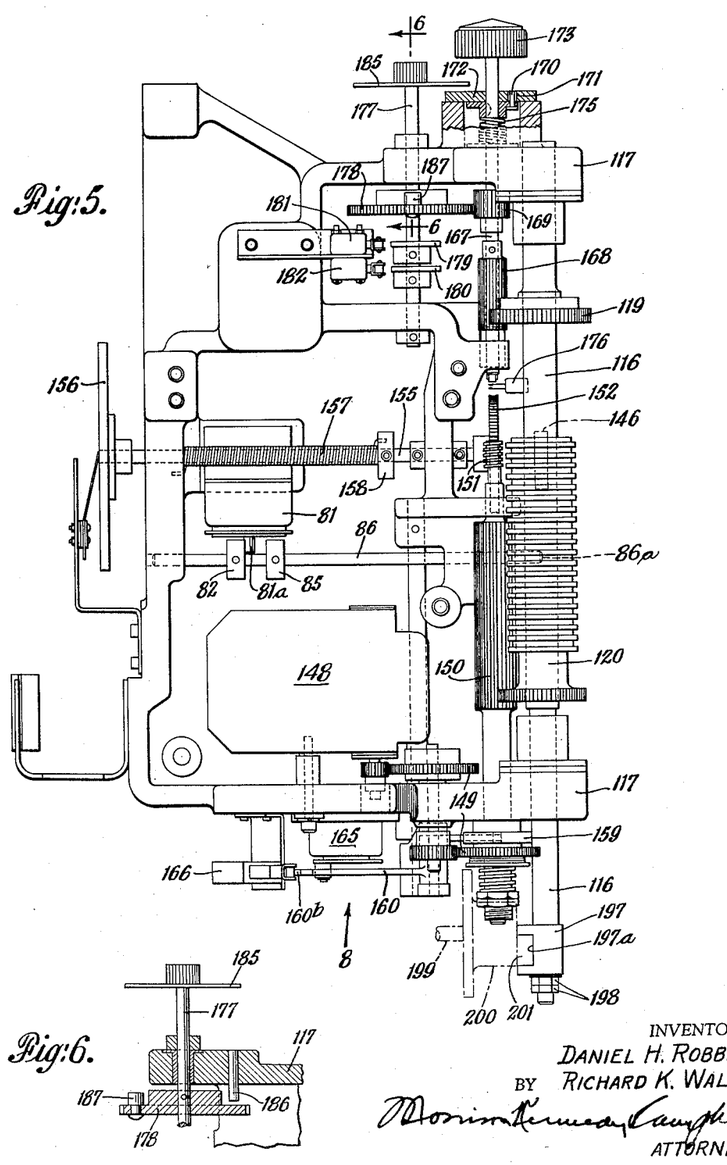
FIG. 5 is a rear view showing the tape controlled and the manual mechanism for varying the extent of film advance.
FIG. 6 is a detail of the manual leading indicator.

Referring to FIG. 5, the mechanism for effecting manual leading comprises a short shaft 167, disposed near and parallel to the shaft 116, carrying a splined member 168 thereon which engages the peripheral teeth of the upper film stop 119. A gear 169 is fixed on the shaft 167 above the splined member 168 and a knob 173 is mounted on the end of the short shaft outwardly of the magazine. The shaft is normally prevented from being rotated by the engagement of a pin 170, projecting upwardly through a collar fixed on the shaft 167, with a well 171 in the fixed plate 172. A compression spring 175 acts against gravity to maintain the pin 170 in the well 171. When the shaft 167 is to be turned, in order that leading may be added to the film advance control, the knob 173 is depressed against the pressure of the spring 175, to remove the pin 170 from the well, and turned until the pin 170, which rides along the under surface of the plate, snaps back into the well 171 indicating one revolution of the shaft 167. As the shaft 167 is rotated, the shaft 116 will be rotated, and since the film advance control nut 120 is held stationary by the splined shaft 150, the shaft 116 will move through the nut 120, changing the spacing between the stop 119 and the nut 120 in the ratio of one-quarter point for each revolution of the shaft 167.

Figure 8:
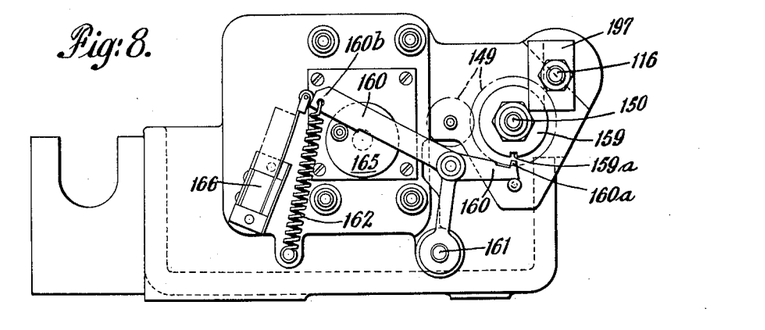
FIG. 8 is a view taken in the direction of arrow 8 of FIG. 5.
Figure 9:
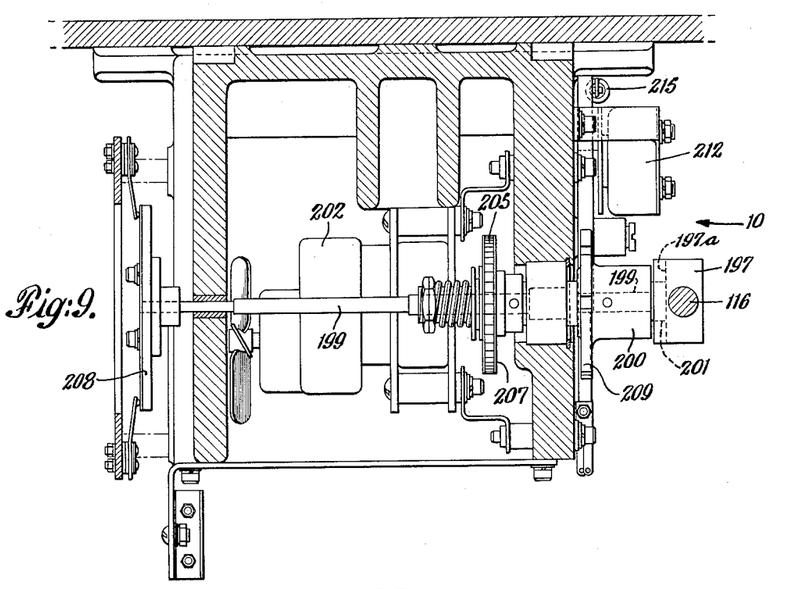
FIG. 9 is a view taken on line 9—9 of FIG. 2, showing a portion of the mechanism for effecting lower slug line alignment of the typographical characters.
Figure 10:
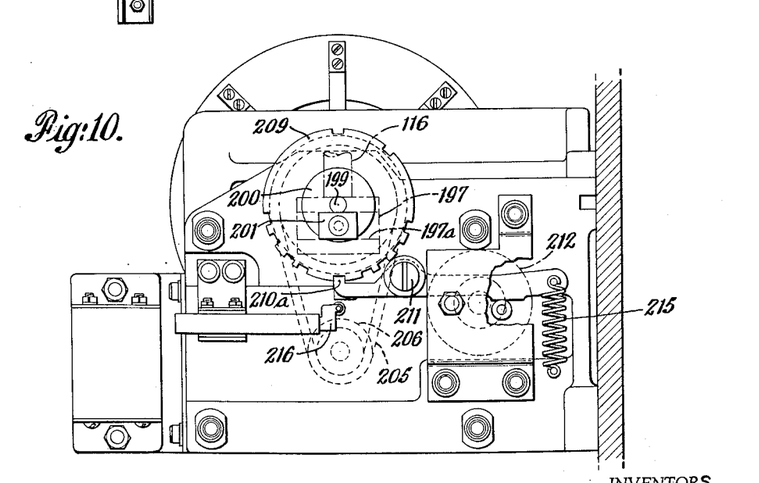
FIG. 10 is a view taken in the direction of arrow 10 of FIG. 9.

When the film advance is changed manually, means must be provided to correct the positioning of the film just as was done when the film advance was changed automatically, as described hereinbefore, and in fact much the same means is employed as was described before, except that in this case the switch 176, which is closed by the lower end of the shaft 167 when the knob 173 is depressed preliminary to rotating the shaft 167, initiates the action instead of the switch 166 (shown in FIG. 8). When the switch 176 is closed, the solenoids 81 and 88 are deenergized to free the film for movement, the rack-down electric clutch 137 and the rack drive motor 130 are energized to keep the rack 118 in contact with the film advance control nut 120 throughout the film advance change, and the solenoid 128 (FIG. 7) is energized so that the clutch in the housing 126 drives in both directions. When the proper amount of manual leading has been set, the pin 170 is permitted to enter the well 171, thus allowing the shaft 167 to move upwardly and the switch 176 to open.

As may be seen clearly in FIG. 5, a second short shaft 177 is disposed near the short shaft 167 and runs parallel thereto. A gear 178 is mounted on the shaft 177 in position for engagement with the gear 169 on the shaft 167, and two cams 179 and 180 are fixed to the shaft 177, below the gear 178, for operating two interlock switches 181 and 182 respectively, the purpose of which will be described hereinafter. The shaft 177 has a disc 185, mounted at its upper end, which is provided with dial markings on its upper face to indicate to the operator whether any manual leading has been set, and if so whether it is positive or negative.

It is important that the operator be prevented from adding more than one point of leading to the film advance control while mistakenly believing that he is only adding a fraction of a point. Toward this end, an abutment 186 (see FIG. 6) projects downwardly from the magazine frame into the path of travel of a pin 187 projecting upwardly from the upper face of the gear 178. When no leading has been set by the manual leading control, i.e. when there is zero manual leading, the pin 187 will be disposed 180° from the abutment 186 as shown in the drawing, and the operator will be permitted to rotate the shaft 177 180° in either direction before the pin 187 strikes the abutment 186 and prevents further rotation, thus adding, up to one point, of either positive or negative leading to the film advance control.

One other danger arises when the manual leading control is employed and it occurs when negative leading is set into the film advance control and thereafter the control tape calls for a zero film advance. Zero film advance may be called for, for example, when a first short line is composed and quadded left, leaving white space to the right thereof, and then a second short line is composed, quadded right, and placed into the white space left by the first short line. Since, in such a case, two successively composed short lines are to be positioned on the same line rather than on successive lines, the film must not be advanced between composition of the short lines. In order to avoid advance of the film, after the first short line has been composed, the film advance control nut 120 is driven up the shaft 116 the proper amount so that the rack 118 is held tightly between the upper rack stop 119 and the nut 120. Energization of the rack drive motor will, of course, then have no effect. The amount that the nut 120 is driven up the shaft 116 is determined by the commutator 156 which controls the film advance control motor, and since the commutator is not affected by the manual leading control, the setting of negative leading by the manual means, which reduces the spacing between the stop 119 and the nut 120, will not be considered by the commutator. Therefore, the motor 148 will attempt to drive the nut 120 up the shaft 116 more than is necessary to bring the upper end of the rack 118 into contact with the upper stop 119, thereby probably causing damage to the parts. This undesirable result is avoided by providing the shaft 177 with the two cams 179 and 180 (FIG. 5) shaped to actuate the two interlock switches 181 and 182, the switch 181 being actuated whenever any amount of negative leading is set into the film advance control by the manual leading control, and the switch 182 being actuated whenever any amount of leading, positive or negative, is so set. When the switch 181 is closed, and zero film advance is called for on the tape, the film advance control means will be shut down and will not respond to the code signal until the negative leading is removed. The switch 182 operates a signal to inform the operator that manual leading is set into the film advance control, so that he may know the reason for the shut down of the film magazine mechanisms, or so that he will realize that positive leading has been added by the manual leading control, should this be the case, which must be removed if the film is not to advance.

An important feature of the present film magazine is the ease with which it may be altered from an English-point machine to a Didot-point machine, the size of the former point, of course, being a fraction of an inch smaller than the size of the latter. This feature involves modification of the film advancing means so that in response to the same signals in the tape, the film will be advanced according to one point system or the other, whichever is desired. To accomplish this versatility, the sector gear 121 is made interchangeable with another sector gear having a different pitch diameter, thus changing the amount of film advanced for an equal distance of travel of the rack, and the rack 118 is made interchangeable with another rack whose pitch diameter accords with the changed sector gear. Finally, the shaft 139 (see FIG. 3) is respaced from the shaft 116 in order that the pinion 146 engages the new rack properly.

The description up to this point has mentioned two ways to operate the rack 118 in order to drive the film drive roller 31 for moving the film. One manner of operation involves the rack drive motor 130 and its associated mechanism which serve to advance the film after each line of typographical matter has been composed thereon, and the other manner of operation involves the film advance control motor 148 and its associated mechanism which serve, as a secondary function, to shift the film so that the last amount of film advanced accords with the new amount of film advance. (The primary function of the film advance control means, of course, is to vary the spacing between the stop 119 and the nut 120.)

Figure 14:
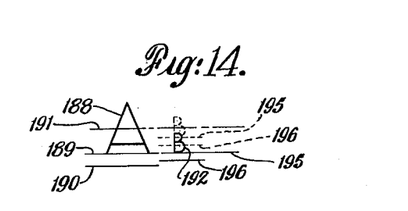
FIG. 14 shows a portion of a type line.

Hereinafter, a third means is disclosed for operating the rack 118, and the purpose of this means is to shift or reposition the film in order to effect lower slug line alignment of the typographical characters which comprise a type line. Moreover, the film is repositioned, as will be described, without affecting the amount of film advance, i.e. the spacing between the stop 119 and the nut 120. The circumstance which necessitates film repositioning for lower slug line alignment may be explained with reference to FIG. 14, wherein a type character 188 is shown in relation to its own imaginary "Z" line 189 and lower slug line 190. Note that the spacing between the "Z" line of a character and its lower slug line varies directly with point size, i.e. the spacing is smaller for smaller point size type. A third imaginary line 191, disposed parallel to the "Z" line and lower slug line, runs through the character 188 at its midpoint. If it is desired, during the composing process, to compose a character 192 having a "Z" line 195 and a lower slug line 196 alongside the character 188, and the point size of the former differs from that of the latter, a group of point size changing lenses, which form part of the optical system of the photo-typographical machine (see copending application Serial No. 624,136, filed November 23, 1956, now Patent Number 2,923,212) are actuated so that, for example, a reduced size character is formed on the film. The resulting position (shown in broken lines) of the reduced size character 192 with respect to the line 191 is exactly the same as the character 188, i.e. the proportion of both characters above and below the line 191 is the same. This position is, of course, unsatisfactory since in a printed line, the "Z" lines of all the characters are colinear, and therefore, before the character 192 is composed, but after the character 188 has been composed, the film is repositioned, by means to be described, so that after composition the "Z" lines of both characters will be aligned. The above mentioned third means for operating the rack 118, which is to be described presently, is employed to effect lower slug line alignment of the film and not "Z" line alignment. Since the spacing between "Z" lines and lower slug lines varies with point size, aligning the lower slug lines 190 and 196 does not result in "Z" line alignment as well. Therefore, although the major portion of the film repositioning operation is accomplished when the lower slug lines 190 and 196 are aligned, a further slight amount of film shift is needed to align the "Z" lines 189 and 195. To accomplish this, the film advance control nut 120 is rotated the proper amount, by means of the film advance control motor 148, to move the rack and hence the film as fully described hereinbefore.

As has just been mentioned, film repositioning for lower slug line alignment takes place when more than one point size of type is composed on the same line. If the subsequently composed character is of smaller point size, the film will be moved backwardly, whereas if it is larger, the film will be moved forwardly. Another situation in which lower slug line alignment is employed occurs when, for example, a 6 point line is being composed, and the film is being advanced 10 points between lines, and a succeeding line is to be composed in 8 point type while the film advance remains 10 points. In such a case, the film will be repositioned in order to properly position the 8 point line in relation to the 10 points of film advance.

Referring now to FIGS. 2, 5, 9 and 10, the shaft 116, which is slidable axially due to its loose mounting in the magazine frame 117, has mounted on its reduced lower end a slotted block 197 held in place by the fasteners 198. The reduced lower end of the shaft 116 is free to turn within the block 197 so that the block is not affected when the shaft 116 is rotated. A horizontal shaft 199 disposed perpendicular to the shaft 116 and lying in a common vertical plane therewith, carries a flanged collar 200 adjacent one end thereof. The collar 200 is provided, on its outside face, with an eccentric block 201 in pinned relationship thereto, whereby the block 201 is free to rotate with respect to the collar 200. The block 201 is so sized that it fits snugly into the slot 197a of the block 197 and is slidable therein. With this arrangement, then, when the shaft 199 is rotated, the eccentric block will cause the shaft 116 to be raised or lowered depending on the direction of rotation of the shaft 199.

The shaft 199 is powered by a point size control motor 202 through a chain drive 205 trained about a sprocket wheel 206 on the motor shaft, and a sprocket wheel 207 on the shaft 199. At its end opposite the collar 200, the shaft carries a commutator 208 which controls the direction of rotation of the motor 202. The flange 209 of the collar 200 is provided with a series of notches (FIG. 10), each notch corresponding to a point size of type characters which may be composed. A latch 210, pivotally mounted on the magazine frame at 211, has a finger 210a which engages any one of the notches in the flange 209 to lock the mechanism against rotation.

When a code signal in the tape calls for lower slug line alignment, the solenoids 81 and 88 are deenergized to free the film for movement, and the rotary solenoid 212 is energized, pivoting the latch 210 against the force of the tension spring 215 (which is mounted between one end of the latch and the magazine frame), thereby freeing the shaft 199 for rotation. At the same time, the latch actuates a switch 216, thus energizing the rack-down electric clutch and the rack drive motor to keep the rack 118 in contact with the film advance control nut 120 throughout the repositioning of the film, and energizing the solenoid 128 so that the clutch on the shaft 122 drives in both directions, all as mentioned before. In addition, the motor 202 is energized to rotate the shaft 199 which moves the shaft 116 up or down, whereby the film drive roller 31 is driven to reposition the film for lower slug line alignment. Just before the film reaches its proper position for the point size being composed, the commutator will cause the solenoid 212 to be deenergized, whereupon the finger 210a is permitted to contact the edge of the flange 209 directly in front of the notch which corresponds to the point size being composed. Upon further rotation, the finger drops into the notch, thus locking the mechanism against further movement, and the switch 216 is opened, deenergizing the motor 202 and returning the rack drive mechanism to normal.

Summarizing the operation of the present invention: When composition of a line of typographical characters has been completed, the film is perforated adjacent both ends of the line, assuming that a platen unit having punches is being employed, and then the solenoids controlling the platen and the vacuum bellows are deenergized preparatory to film advance. The film advance sequence is initiated by energizing the rack-up electric clutch and the rack drive motor which serve to drive the rack upwardly against the upper rack stop, whereupon the torque sensitive clutch deenergizes the rack-up clutch and energizes the rack-down electric clutch, whereby the rack is driven downwardly to advance the film until it strikes the film advance control nut. The torque sensitive clutch then deenergizes the rack-down clutch and the rack drive motor, and photography of the next line may proceed.

Should, however, the machine read a change of film advance signal on the control tape, then before composition of a new line begins, the latch solenoid 165 is energized to disengage the latch 160 and latch plate 159, and the film advance control motor is energized to rotate in the proper direction, depending upon whether film advance is to be increased or decreased. The latch operates a switch which energizes the rack-down electric clutch and rack drive motor, thereby serving to maintain contact between the rack and the film advance control nut as the nut is rotated by the film advance control motor, and the solenoid 128 is energized, enabling the rack to advance the film when moving in either direction. The rack, therefore, moves with the nut and repositions the film so that it accords with the new amount of film advance. Just before the new position of the control nut is reached, the solenoid 165 is deenergized, allowing the latch 160 and the latch plate 159 to lock the film advance control motor when the new position of the control nut is reached. The rack-down electric clutch, the rack drive motor and the solenoid 128 are deenergized, and composition may resume.

Finally, should the control tape signal a point size change, the latch solenoid 212 is energized to disengage the latch 210 and the notched flange 209. The latch 210 operates a switch to perform the same function as the switch operated by the latch 160, and upon energization of the point size control motor for rotation in the proper direction, the shaft 116 is moved axially carrying the rack therewith, thereby repositioning the film for lower slug line alignment of the typographical characters.

The invention has been shown and described in preferred form only and by way of example, but many variations and modifications may be made therein and in its mode of application which will still be comprised within its spirit. It is understood, therefore, that the invention is not limited to any specific form or embodiment, except insofar as such limitations are specified in the appended claims.

What is claimed is:

1. In a phototypographical machine wherein a film is advanced endwise through the machine in step by step fashion and upon which transverse lines of typographical characters are photographed one after another in spaced relation, the combination of means operable after the composition of each successive line for effecting such advance of the film to the successive photographic positions, and means distinct from said advancing means and operable during the composition of a line for repositioning the film endwise in order to effect lower slug line alignment of the typographical characters composing a line.

2. The combination according to claim 1, wherein said film is provided with a series of feed holes along one edge thereof, and said film advancing means include a sprocket wheel for engaging said feed holes.

3. The combination according to claim 2, wherein said film repositioning means include the said sprocket wheel.

4. In a phototypographical machine wherein a film is advanced endwise through the machine in step by step fashion and upon which transverse lines of typographical characters are photographed one after another in spaced relation, the combination of means operable after the composition of each successive line for effecting such advance of the film to the successive photographic positions, said means including a member adapted to be reciprocated, means limiting the extent of reciprocation of said member, and means distinct from said advancing means but including said reciprocatory member and operable during the composition of a line for repositioning the film endwise in order to effect lower slug line alignment of the typographical characters composing a line.

5. The combination according to claim 4, wherein said limiting means comprise a pair of adjustable stops whereby the extent of reciprocation of said member may be varied in acordance with the point size or leading of the lines of typographical characters being photographed.

6. The combination according to claim 5, wherein said reciprocatory member remains stationary with respect to one of said stops during repositioning of the film.

7. The combination according to claim 5 including a shaft, said adjustable stops being mounted on said shaft in space relation, and said reciprocatory member being slidably mounted on said shaft between said stops.

8. The combination according to claim 7, wherein said shaft moves axially during repositioning of the film for lower slug line alignment.

9. In a phototypographical machine operated under control of a coded tape and wherein a film is advanced endwise through the machine in step by step fashion and upon which transverse lines of typographical characters are photographed one after another in spaced relation, the combination of means responsive to a code signal in the tape for effecting such advance of the film to the successive photographic positions, means responsive to a code signal in the tape for varying the extent of the film advance, and means distinct from said advancing means and responsive to a different code signal in the tape for repositioning the film endwise in order to effect lower slug line alignment of the typographical characters.

10. The combination according to claim 9, wherein said tape responsive means for varying the extent of film advance include a pair of spaced adjustable stops.

11. The combination according to claim 10, wherein the tape controls the spacing between said adjustable stops in accordance with the point size or leading of the typographical character being composed.

12. The combination according to claim 11, wherein the spacing between said adjustable stops may be varied in increments of one point.

13. The combination according to claim 12 including manually operable means for varying the spacing between said stops in increments of less than one point.

14. The combination according to claim 13, wherein a signal informs the operator when and as long as said manually operable means is employed to decrease the spacing between said stops.

15. The combination according to claim 13, wherein variation in the extent of film advance is prevented when and as long as said manually operable means is employed to decrease the spacing between said stops and the coded tape calls for a zero film advance.

16. The combination according to claim 11, wherein the film advance is effected by means of a reciprocating member, said member being disposed between said stops and operated in response to different code signals in the tape.

17. The combination according to claim 16, wherein said stops and said reciprocating member are mounted on an axially movable shaft, said shaft forming part of the tape responsive means for effecting lower slug line alignment of the typographical characters being composed.

18. The combination according to claim 17, wherein the tape controls the axial movement of said shaft in accordance with the point size of the typographical characters being composed.

19. The combination according to claim 18, wherein the movement of said shaft and the relative movement between said adjustable stops are independently effected, whereby the extent of film advance and the repositioning of the film for lower slug line alignment are completely independent.

20. The combination according to claim 19 including driving means for varying the spacing between said adjustable stops, and means for arresting and locking said driving means when said stops reach a relative position in accordance with the extent of film advance called for by the tape.

21. The combination according to claim 20, wherein said arresting and locking means comprise a solenoid operated latch and a notched latch plate.

22. The combination according to claim 19 including driving means for moving said shaft axially, and means for arresting and locking said shaft driving means when said shaft reaches a position in accordance with the point size called for by the tape.

23. The combination according to claim 22, wherein said arresting and locking means comprise a solenoid operated latch and a notched latch member.

24. The combination according to claim 18, wherein said advancing means include a solenoid actuated clutch which normally only transmits motion in one direction but which is operable to transmit motion in two directions when the spacing between said adjustable stops is being varied.

25. The combination according to claim 24, wherein said clutch is also operable to transmit motion in two directions when said shaft is being moved axially.

26. The combination according to claim 25, wherein the film is repositioned endwise as the spacing between said adjustable stops is being varied and as said shaft is being moved axially.

27. The combination according to claim 26 including a roller about which the film is threaded, said roller serving to maintain the film under tension during endwise movement thereof.

28. The combination according to claim 26 including a platen for clamping the film in photographic position, and means for supplying said platen with a vacuum, said platen being operable to release the film and said vacuum supplying means being adapted to break the vacuum during endwise movement of the film.

29. The combination according to claim 28, wherein said vacuum supplying means is operable to supply a vacuum to a portion only of said platen.

30. In a phototypographical machine wherein a film is advanced endwise through the machine in step by step fashion and upon which transverse lines of typographical characters are photographed one after another in spaced relation, the combination of means operable after the composition of each successive line for effecting such advance of the film to the successive photographic positions, adjustable means for varying the extent of the film advance, and means distinct from said advancing means and operable independently of said adjustable means during the composition of a line for repositioning the film endwise in order to effect lower slug line alignment of the typographical characters composing a line.

31. In a phototypographical machine wherein a film is advanced endwise through the machine in step by step fashion and upon which transverse lines of typographical characters are photographed one after another in spaced relation, the combination of means for effecting such advance of the film to the successive photographic positions, adjustable means for varying the extent of the film advance, and means distinct from said advancing means and operable independently of said adjustable means for repositioning the film endwise in order to effect lower slug line alignment of the typographical characters, said film repositioning means being reversible in operation so as to move the film endwise in either direction in repositioning it for lower slug line alignment.

References Cited in the file of this patent

UNITED STATES PATENTS

| | | |
|---|---|---|
| 2,351,399 | Caracciolo | June 13, 1944 |
| 2,377,754 | Bryce | June 5, 1945 |
| 2,496,329 | Briechle | Feb. 7, 1950 |
| 2,520,799 | Debrie | Aug. 29, 1950 |
| 2,701,991 | Croucher | Feb. 15, 1955 |
| 2,725,801 | Dewhurst | Dec. 6, 1955 |